Nov. 5, 1929.  S. H. WEAVER  1,734,930
TEMPERATURE STABILIZED SHAFT FOR TURBINES AND METHOD OF MAKING THE SAME
Filed Dec. 22, 1927
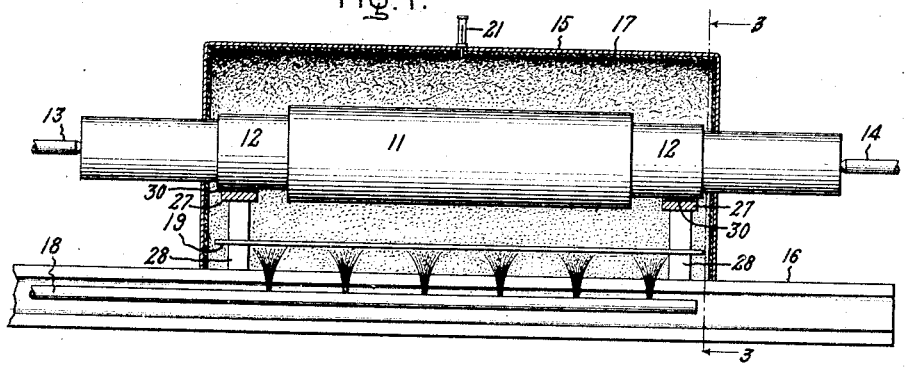
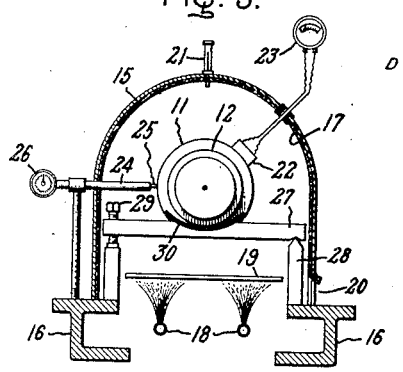
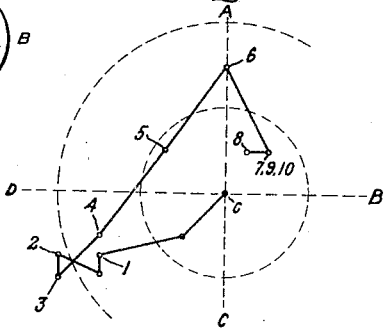
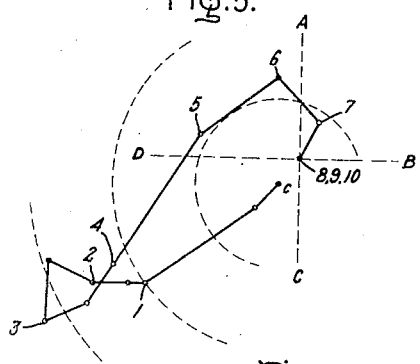
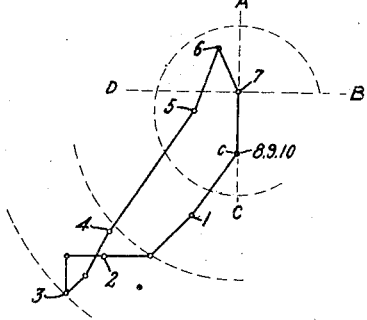
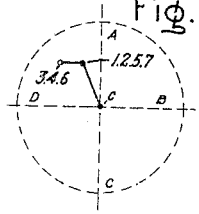
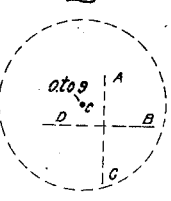
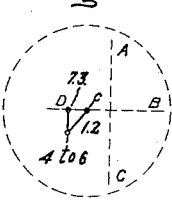
Inventor:
Simon H. Weaver,
by *Alexander S. [illegible]*
His Attorney.

Patented Nov. 5, 1929

1,734,930

UNITED STATES PATENT OFFICE

SIMON H. WEAVER, OF SCHENECTADY, NEW YORK, ASSIGNOR TO GENERAL ELECTRIC COMPANY, A CORPORATION OF NEW YORK

TEMPERATURE-STABILIZED SHAFT FOR TURBINES AND METHOD OF MAKING THE SAME

Application filed December 22, 1927. Serial No. 241,992.

It is a well known fact that the shafts of some large high speed turbines cause trouble in operation by giving rise to what is commonly termed "rough running" meaning thereby, that the turbine rotor vibrates when in service. Such action does not always take place under the same speed and load conditions either in the same or in different machines. Heretofore the reason for this has not been understood and prior to my invention no remedy had been found successful although various efforts had been made to find and cure the trouble.

These shafts are of very massive construction frequently being from 16 to 17 feet long with a diameter at the largest portion of from 18½ inches to 24 inches. The larger shafts may weigh as much as 20,000 pounds. Mounted on each of such shafts in an impulse type of turbine is a number of bucket wheels which greatly add to the total weight of the rotor. Due to the arrangement of wheels successive portions of the shaft are subjected to different and decreasing steam temperatures from the inlet to the exhaust of the turbine.

Strange as it may seem, to one not familiar with such matters, these massive shafts which are true when cold can and do deflect when hot and in service and thus assume a bow-like form between the ends. The amount of the deflection from the axial line is small as measured in standard units of measurements but nevertheless the effect is very marked. For example, in the case of a rotor having seventeen wheels rotating at 1800 R. P. M. weighing 40,000 lbs., if the center of the shaft has a deflection of three one-thousandths of an inch, this eccentricity of the mass will exert a sidewise pull or load on the bearings over and above the normal load first on one side and then on the other of approximately 11,000 pounds.

It has been appreciated by concerns engaging in making shafts from forgings as well as by turbine manufacturers utilizing such shafts, that the physical characteristics or properties thereof differ somewhat from the axis toward the periphery and for that reason it was considered desirable to have the axis of the mass of the billet correspond generally with the axis of the finished shaft. It was not entirely appreciated however, prior to my invention, how important the coincidence of the two axes is. Furthermore, the methods of procedure in the forge shops were not of such a character as to ensure this relation even had it been fully understood and appreciated. In one instance which has come to my attention, the two axes were displaced at one or both ends of the shaft by as much as half of an inch whereas my experience teaches that this displacement should not exceed one eighth of an inch if quiet running is to be assured for the turbine in which the shaft is located. The more nearly exact coincidence is obtained the better will be the results.

The general procedure in forging these big shafts is to cast a billet containing the necessary amount of metal, then re-heat the same to forging temperature and by a succession of pressing operations elongate the billet and reduce its diameter to the required dimensions. The billet which is approximately octagonal at the start is first pressed in a plane passing diagonally through two of the corners, then turned and pressed a second time at an angle to the first and so on, the billet being re-heated from time to time as required. When the shaft is forged in the rough it is annealed first at high temperature, then at a lower temperature and finally at a temperature of about 600 or 700 degrees C. to remove internal strains. It is evident that the successive pressing operations while generally preserving the proper relation of billet axis to shaft axis are not such as to fully ensure the desired coincident of such axes and depend to a marked degree on the skill of the forger. In many but not all cases, it is the custom of the forge works to "heat-treat" the shaft to improve its physical characteristics. This is done by heating the shaft to a predetermined high temperature and subsequently quenching or drawing it at some lower temperature. This has the effect of hardening the steel, and care must be exercised not to get it too hard since to do so would render subsequent machining operations difficult.

Between annealing operations the rough shaft is turned to remove the scale and it is at this point where the present methods of manufacture sharply fall down. The roughly formed shaft prior to the first turning operation is centered according to the exposed mass at the ends and this whether the axis of the billet corresponds to the axis of the shaft, or not. One of the difficulties presented in this situation is that it is not always possible to detect the coincidence or lack thereof by inspection with the naked eye, or for that matter with a microscope. Furthermore, after the centers are once determined at the forge shop they have been used by it in all subsequent machining operations. After the third and in some cases the second annealing operation, unless heat-treated, the shaft is regarded as finished by the forge works and is then delivered to the customer to be machined to definite size and shape. The customer may use the same centers as the forge shop or may make new ones depending upon its requirements but in no case that I know of has it been considered necessary to find the billet axis and use it as the axis or center for the finishing shaft. From the foregoing it is evident that whatever errors were made in the forge shop were generally carried through into the finished shaft.

My study of the subject which has extended over a considerable period of time and which includes many tests, has led me to the definite conclusion that the trouble due to the so-called "rough running" is fundamentally due to the way the shaft is made, beginning with the forging and ending with the finished article ready to receive the bucket wheels.

In addition to ascertaining the failure in centering the shaft to obtain coincidence of billet and shaft axes, I have determined by test that the machining, grinding and polishing operations which the shaft receives prior to mounting the wheels thereon result in surface strains which effect the operation of the shaft when in operation in the turbine by causing it to bow and while the reason for this is perhaps not fully understood, it is believed to be due to some change in the surface crystals of the steel, which change is not uniform over the shaft. I have discovered that this objection can be overcome by subjecting the shaft, including its journals, after it has been machined, polished and otherwise completed, to a moderately high temperature for a certain and appreciable length of time and one below that at which metallurgists in general maintain that a change into the crystalline structure of the steel can possibly take place. By preference the temperature used corresponds approximately to the highest steam temperature to which any portion of the shaft is subjected in service. In this connection, it should be borne in mind, especially in a multi-stage turbine of the impulse type where a large number of wheels is mounted on the shaft, that only the first stage is subjected to high temperature steam, the second and succeeding stages operating at very much lower temperatures, the temperature in the last stage being only slightly above that of the cooling water in the condenser.

My invention has for one of its objects the provision of a shaft, especially for high speed turbines, which, when in operation in such a turbine, is stable under all conditions of operating temperatures and which is free of the so-called "rough running" previously mentioned. A further object of my invention is the method of making such shafts.

In the accompanying drawing, Fig. 1 is a view in section of an oven containing a typical turbine shaft; Fig. 2 is an end view of the shaft; Fig. 3 is a cross-section of the oven; Figs. 4, 5 and 6 are actual diagrams on a greatly enlarged scale illustrating the deflections or distortions of a shaft after being finished and before being fully subjected to treatment in accordance with my invention; Figs. 7, 8 and 9 are actual diagrams of the same shaft after being treated in accordance with my invention.

In Fig. 1 is shown a typical shaft comprising a massive central portion 11 and end portions 12 of somewhat reduced cross-section which when properly shaped form the journals and other necessary parts of the completed shaft. Such a shaft is forged from a billet and later centered, rough-turned and annealed two or three times and may be heat treated by the forge shop as indicated above. The shaft when delivered by the forge shop has placed on one end the letters A, B, C and D as shown in Fig. 2, said letters being displaced by 90°. It has been the custom for a long time for turbine makers to specify to the forge shops that the shafts shall not deflect more than three one-thousandths of an inch when heated to a temperature of 135° C. The amount of deflection is determined by first heating the shaft in an oven and while hot slowly turning the shaft and making suitable readings at points A, B, C and D. If the rough turned shaft was within the specifications as to deflection and otherwise appeared to be good, it was accepted and from it the finished shaft was made. Even though shafts fully came up to the specifications as to deflection above noted and otherwise appeared to be perfect, it was found when in service in a turbine that they did not always perform as they should.

As the first step in the manufacture of a shaft in accordance with my invention, the billet is so forged as to maintain the axis of the billet as nearly as possible coincident with the center of the rough turned shaft, or in other words, the center of chemical segregation of the mass forming the shaft should correspond as closely as possible to its axis of rotation. The chemical center is the point about which all of the steel has symmetrical properties at any distance from said point, and particularly those properties relating or bearing on expansion, and should also be the mechanical center of the shaft to prevent a greater expansion on one side than on the other. After forging, the shaft is centered and rough turned and it should be properly annealed two or three times in an annealing furnace to remove cooling and forging strains, the scale being removed by turning after each anneal. By preference, the shaft during the annealing operation is suspended from one end in a properly constructed furnace as this serves to more fully remove the internal strains than where the shaft is arranged horizontally. The last step in the forging process is to heat the shaft and quench it at some predetermined temperature which determines the hardness of the metal.

Upon completing the shaft thus far it is tested for deflection according to established practice. This may be done in a special oven or I may use for the purpose the same type of oven which as stated above is in ordinary use. The shaft is supported on lathe centers at its ends and before so doing, I may re-center the shaft or use the original centers, depending upon conditions, and while in the furnace slowly heat the same to a temperature of 400 degrees C., which is substantially above that of the prior practice for this purpose, slowly turning the shaft and making indicator readings from time to time at suitable locations along its length to determine the deflection. Such a test will show whether the shaft is of such a character as to justify beginning the finishing machine operations or whether it should be further annealed or otherwise treated or scrapped. The preferred way, and prior to heating the shaft, unless it be apparent that the shaft and billet axes approximately coincide, is to cut off both ends thereof for a short distance and recenter it, using for the purpose of determining the new centers, the center of chemical segregation of the mass at the shaft ends what are known as sulphur prints. Such prints when properly taken will show quite accurately the center of segregation, being darkest where the segregation is greatest. Using the prints as a guide new centers are formed in the shaft ends and located in the centers of the darkest areas to receive the lathe centers and on which the shaft is afterwards turned and otherwise treated.

Assuming the shaft appears to be satisfactory the next step is to finish it by turning and grinding to the exact size and dimension and imparting to the journals an especially high finish by the lapping process. Grinding and lapping, being ordinary machine shop processes, were not regarded as being injurious to the shafts' behavior when in service but contrary to this belief, my investigation has determined that they caused surface strains in the metal of the shaft and are accountable for the poor performance of shafts. The fact that shafts, when similarly treated, did not all have poor running characteristics, only served to make the reason more obscure. This was probably due to the fact that in some cases the forgings were better than in others to start with, that the axis of the billet corresponded more closely with that of the shaft, and that exactly the same depth of cut and pressure exerted by the tools in the machining operations were not the same in all cases.

After the shafts have been finished to size and shape and the journals polished, the final step in the process is begun. The finished shaft with the keys removed is placed in an oven, which may be the same as the one used to initially determine the deflection. The oven is long enough to cover the central body of the shaft and also its journals, the said oven and shaft being heated by gas or other means. While in the oven the shaft is supported by lathe centers and is slowly rotated. A speed of two revolutions per minute has been found to be satisfactory. The shaft is gradually heated in the course of 4 or 5 hours to a temperature of 400° C., the increase of temperature being at the rate of about 100° C. per hour except for the last hour when the rate is lower. The surface temperature of the shaft as it rotates is measured by one or more thermo-couples which is or are in sliding contact with the periphery of the shaft. Each couple is connected to a mili-volt meter which may be calibrated in terms of temperature. The shaft is held at 400° C. (750° F.) for several hours during which time deflection readings are taken hourly by suitable means until three consecutive readings repeat in value which indicates that the surface strains have been removed. This usually happens in the sixth or seventh hour or even the eighth. After this the gas is turned off and the casing partly opened for cooling until the temperature of the shaft at the surface is reduced to 100° C. During the cooling operation the shaft is rotated as before until the said temperature is reached when it is stopped. Commonly the shaft is subjected to heat while in the oven from 8 to 10 hours, and the cooling portion of the cycle takes 12 hours. The shaft is further permitted to cool after removal from the oven for two days before the wheels are mounted thereon.

With a normal shaft, under the conditions specified, the maximum deflection usuallly occurs at the third hour when the temperature is 300 to 350° C., decreasing thereafter even while the temperature of the oven and shaft is rising until the minimum or nearly zero deflection is obtained during the sixth or seventh hour. Any deflection of the shaft produces an eccentric relation, i. e., a slight bowing of the shaft from end to end, and this eccentricity is determined by suitable indicators located preferably but not necessarily at three spaced locations along the length of the shaft. Cold readings may be made when the shaft is first put in the oven and are taken or repeated after the shaft has been permitted to cool. From the data thus obtained in the sets of readings, it can accurately be determined if the shaft will be temperature stable when in operation in the turbine.

As a check against the above, shafts have been permitted to cool from two to five days after which the temperature cycle has been repeated once and in some instances twice without the shafts deflecting a greater amount than the permissible test error of about .0005 of an inch. After a shaft has been subjected to the above treatment it is ready for use in a turbine. As a matter of shop practice it has been found to be unnecessary to make a second test.

Having outlined the method of procedure in temperature stabilizing shafts, I will now describe some suitable apparatus for practicing the method. The shaft 11 is mounted on lathe centers 13 and 14, the former being the live center, driven by suitable means on the head stock of the lathe and the latter, the dead center, being mounted in the tail stock. To simplify the illustration, these latter details of the lathe have been omitted. Over the shaft is a suitable U-shaped covering 15 which may be made of sheet iron and supported along its lower edges by the frame bars or rails 16 of the lathe. The casing is protected by heat insulation such as asbestos 17 which may be inside or out. Below the shaft and between the frame members are longitudinally-extending gas-conveying tubes 18 which have suitable burner orifices suitably spaced throughout the area desired to be heated. Above the burner is a baffle plate 19 to prevent the gas flames from acting directly on the shaft. Extending along the side of the casing is a longitudinal opening 20, Fig. 3, to permit of the escape of products of combustion. In the top of the casing are suitable wells in which are located thermometers 21 to indicate the temperature and enable the operator intelligently to regulate the supply of gas. The temperature of the shaft is determined by one or more thermo-couples 22, usually three, of any suitable construction, each of which is contained in a metal box covered by asbestos, the box riding on the peripheral surface of the shaft. From each thermo-couple conductors lead to a millivoltmeter 23 which is calibrated in terms of temperature. On the side of the casing is a standard for supporting a horizontal tube 24 within which is a plunger 25 that is pressed by a spring against the periphery of the shaft, said plunger being moved back and forth to follow the eccentricity or bend of the shaft. 26 represents a Starrett or other suitable indicator by means of which the movements of the plunger can be determined. Such an indicator is very sensitive to minute movements and by means of multiplying means gives a relatively large indication for a very small movement of the plunger. As the continued rotation of such a heavy shaft would wear the lathe centers, a means is provided for taking the weight off of them except at such times as the deflection readings are being made. A simple arrangement for the purpose comprises a cross-member or bar 27 which is supported at one end by a knife edge pivot 28 and at the other end by a vertical post and adjusting screw 29. On the upper side of the member is a suitable bearing surface element 30 which supports the shaft except when the readings are being made. The shaft is similarly supported at both ends. When the shaft is supported by the bearing elements 30, the lathe centers may be moved back slightly to free them of the load but when readings are to be taken, they are moved into their proper places and the bearing elements 30 are lowered by turning the screws 29 in the proper direction. After a set of readings is made the elements 30 are again elevated and the lathe centers moved back to free them of their load. For the lathe centers white lead and oil has been found to be a satisfactory lubricant.

Figs. 4, 5 and 6 are curves taken from an actual test which show the amount of deflection of a shaft heated to 400° C., which shaft was made by the customary shop methods and which prior to my invention would have been passed as a satisfactory shaft. As previously stated, the shaft has on one end the letters A, B, C and D and these are employed in making the test for deflection, the various readings being made when these letters successively register with the indicators. The shaft when being treated, as well as thereafter, is slowly revolved, as for example, at two revolutions per minute and when sufficiently heated readings are taken from the Starrett or other indicators of which three are provided for the present case, located respectively, near the ends of the shaft and in about the middle. The dotted circles in Figs. 4 to 9 are spaced one one-thousandths of an inch apart, the inner circle having a radius of .001 inch, the second .002 inch and so on. To locate each different point on the curve or diagram four readings of the indicator have to be made coinciding with the marks A, B, C and D on the shaft. Considering Fig. 4 first and starting at c as a center with zero deflection, the shaft bowed outwardly in the first hour, until point $c$ moved to position 1 from this it moved to position 2 in the second hour following the path indicated by the connecting lines. From this position point $c$ moved to position 3 in the third hour, the maximum deflection. Continued heating and testing showed that point $c$ moved to position 4 in the fourth hour, then to 5 and 6 from which latter position it turned sharply and moved inwardly to position 7, then to 8 and back to 7 for the ninth and tenth hours of the heat cycle.

Fig. 5 shows a considerably wider deflection, this being the region of the shaft corresponding to the fifth stage of the turbine for which the shaft was intended. In this instance point $c$ was found to be slightly below the line D—B, and the maximum deflection, about .00345″, occurred at or about the end of the third hour as indicated by position 3, after which it followed a course similar to that in Fig. 4 and finally arrived at position 10 at the end of the tenth hour.

Fig. 6 is a curve or diagram made with respect to the shaft portion occupying the low pressure end of the turbine. In this case $c$ was observed to be slightly below the line D—B at the start and the deflection movements hour after hour are indicated by the solid lines, the dots and numbers indicating the several positions of point $c$ during the run. The maximum deflection in this case was three one-thousandths of an inch as indicated by the outer dotted line circle. It is also to be noted that at the end of the tenth hour point $c$ had returned to the position from which it started.

Figs. 7, 8 and 9 are curves which indicate the deflection of the identical shaft referred to in connection with Figs. 4, 5 and 6 after being treated in accordance with my invention to a temperature corresponding approximately to the highest temperature of the steam to which the shaft is subjected when in service in its turbine, i. e., 750° F. The results of these tests were checked by again following the same procedure outlined above. The inner dotted circle has a radius of .001″ and it will be observed that under no condition does the shaft have a radial deflection from zero greater than said amount; this is particularly noticeable in comparing Figs. 5 and 8 which are drawn to the same scale.

From Fig. 7 it will be seen that point $c$ traveled to position 1 in the first hour, remained there for the second hour, then moved to 3 in the third hour, remained there during the fourth hour, then moved to 5 in the fifth hour, then back to 6 for the sixth hour and finally back to 7 in the last or seventh hour where it coincided with the positions it had for the first and fifth hours. In Fig. 8, point $c$ remained fixed in position during the whole test or run. From Fig. 9 it will be seen that point $c$ had very little movement, the various numbers applied to point $c$ show the positions at each of the hours represented by the numerals 1 to 7 inclusive. These latter curves or diagrams indicate very clearly that the surface strains which were present before the shaft was heated after the various machine operations have been reduced to a value which is negligible and that a shaft when treated in accordance with my invention will, when in use be free from "rough running" due to the effects of surface strains when subjected to its designed steam conditions. As stated above, in connection with Figs. 7 to 9, the maximum radial deflection is substantially less than one one-thousandth of an inch and while such shaft is to be preferred over one having a greater deflection, it is not always necessary to work within such close limits. As an outside limit to obtain satisfactory operation of a turbine when in service the radius of deflection of the shaft should not exceed one and one-half thousandths of an inch, but the nearer the deflection approaches zero the better.

As previously intimated, many turbine shafts, especially those up to 10 inches in diameter, in the course of their manufacture are heat-treated to increase their strength by improving the physical characteristics of the steel. This is done by heating the shaft above the so-called critical temperature of the metal and then quenching it. Subsequently, they are re-heated and drawn to a temperature of from 600 to 700° C., 625 to 675° being the common practice. I wish to particularly emphasize the fact that in treating a shaft in the oven to temperature stabilize it in accordance with my invention, the temperature of the shaft at no time reaches the drawing temperature and in fact is very much below it being of the order of 400° C. against 625 to 675°. With the exception of cutting edge tools practically no drawing or tempering is done commercially below 500° C. It was due to this fact that metallurgists, and especially those accustomed to the problems involved in shaft manufacture, were of the opinion that such a relatively low temperature treatment as employed in my process could not possibly have any effect upon the steel and hence of the temperature stability of the shaft.

Furthermore, it has been the practice of turbine engineers to specify nickel steel shafts as against those made of carbon steel for they were supposed to be less subject to deflection due to temperature changes. I have found, however, that when carbon steel shafts are treated in accordance with my invention, they are fully equal to nickel steel. Since carbon steel is less costly than nickel steel, it follows that a very substantial saving can be made in each instance by using carbon steel and at the same time obtain equally good results in operation.

I have previously referred to the so-called "rough running" of turbines in service. When a case of this kind occurs it has been the practice to re-balance the machine in the field to compensate for the shaft deflection due to temperature changes. Briefly, this has been done by heating the turbine to its operating temperature and while so heated adding weight to one or more of the wheels in the region diametrically opposite to that of maximum deflection, or taking off weight in the region of maximum deflection. A machine so treated will only be in proper balance when operating at some predetermined temperature and for that reason it must be given a definite cycle of operation in starting, with an hour or more of preliminary heating and usually adding the load by relatively small increments until full load operating conditions are obtained. Such a course of treatment is very expensive both to give and to operate under and is often a serious handicap when a sudden and unexpected demand occurs for power and it is necessary to get the machine into service as soon as possible. By temperature stabilizing the shafts during the manufacture the above-mentioned troubles or objections are overcome, the turbine will be in balance and can deliver its load in a short time. The ageing of castings and forgings to relieve strains is commonly practiced. The shaft to which I have referred in Figs. 4 to 9 was aged in its finished condition for five years without becoming temperature stable and only became so after treatment in accordance with my invention.

What I claim as new and desire to secure by Letters Patent of the United States, is:

1. A forged turbine shaft having the axis about which it rotates in substantial coincidence with the axis of the chemical segregation of the mass of which it is composed and which is free of surface strains incident to the finishing machine operations, whereby the shaft is free of objectionable radial deflections when subjected to operating temperatures.

2. A turbine shaft the axis of which approximately coincides with that of the chemical segregation of the metal from which it was made and which is free of surface strains incident to the finishing machine operations whereby the radial deflections of the shaft when in operation are less than one and one-half thousandths of an inch.

3. The method of making turbine shafts which comprises casting a billet, forging the same to approximately the final shape of the shaft with the axis of the billet substantially coinciding with that of the shaft, annealing the roughly-formed shaft to remove internal strains, machining the shaft to its final dimensions, using for the centers the center of the chemical segregation of the material in the shaft ends and heating the active portions of the finished shaft while slowly revolving to a temperature approximately equal to the highest temperature in service to remove surface strains.

4. The method of making turbine shafts which comprises casting a billet, forging the same to approximately its final shape with the axis of the billet substantially coinciding with that of the shaft, annealing the shaft to remove internal strains, forming centers in both ends of the partly formed shaft which are located in the center of the chemical segregation of the metal of the shaft, finishing the shaft to its final dimensions about said centers, and heating the active portions of the finished shaft to a temperature between 350 and 400° C. to remove surface strains due to the finishing operations.

5. The method of making high speed turbine shafts which comprises forging a mass of metal to the approximate shape and size of the finished shaft with the center of the billet substantially coincident with that of the shaft, annealing the shaft to remove internal strains, machining the same to its final shape and size, using for the centers the center of the segregation of the material in the shaft ends, heating the finished shaft in an oven to substantially the highest temperature to which it will be subjected in service, and slowly rotating the same on its centers, measuring the shaft deflection while so heated until the readings thus obtained repeat in value, and slowly cooling the shaft.

6. The mehod of making massive turbine shafts which comprises casting a billet, forging the same into a rough shaft with the center of the billet approximately corresponding with the axis of the shaft, annealing the same to remove the internal strains, finishing the shaft to its final shape and size, using for the centers the center of the chemical segregation of the material in the shaft ends, heating the finished shaft in an oven to substantially the highest temperature to which it will be subjected in service while slowly rotating it on its centers, measuring the shaft deflections when it is so heated at a number of different locations along its length, maintaining the shaft in its heated condition for several hours until the deflection readings repeat in value and are less than one and one-half thousandths of an inch, and slowly cooling the shaft.

7. The method of making turbine shafts which comprises forging the shaft from a billet with the axis of the shaft approximately coinciding with that of the billet, heat treating the roughly formed shaft to give to it the desired degree of hardness, finishing the shaft to its final dimensions, using for the centers the center of the chemical segregation of the material in the shaft ends and temperature stabilizing the same by heating the shaft to a relatively high temperature but one substantially below the quenching temperature of the heat treatment for a considerable period of time to remove the strains incident to the finishing operations.

8. The method of making high speed turbine shafts which comprises forging the shaft from a billet with the axis of the shaft approximately coinciding with that of the billet, annealing the shaft in its partly finished condition to remove internal strains, heat treating the shaft to give to it the desired degree of hardness, finishing the shaft to its final dimensions, using for the centers the center of the chemical segregation of the material in the shaft ends, heating the shaft to a relatively high temperature but one substantially below the quenching temperature of the said heat treatment, slowly revolving the shaft about its centers while hot and measuring its deflections until said deflections repeat in value, and finally slowly cooling the shaft.

9. The method of making turbine shafts which comprises facing the ends of the roughly formed shaft, making suitable prints to show the chemical segregation at said ends, forming the centers for the shaft in the centers of such segregations, machining the shaft to the finished size on said centers, heating the shaft and its journals to substantially the highest temperature to which it will be subjected in service while slowly rotating it on said centers, maintaining the shaft in its heated condition until the shaft deflections repeat in value and are less than one and one-half thousandths of an inch, and slowly cooling the same.

In witness whereof, I have hereto set my hands this 20th day of December, 1927.

SIMON H. WEAVER.